(12) United States Patent
Na et al.

(10) Patent No.: US 8,760,350 B2
(45) Date of Patent: Jun. 24, 2014

(54) MOBILE TERMINAL

(75) Inventors: Youngsoo Na, Gimpo-si (KR); Geunsu Kim, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 501 days.

(21) Appl. No.: 13/110,753

(22) Filed: May 18, 2011

(65) Prior Publication Data

US 2011/0286174 A1 Nov. 24, 2011

(30) Foreign Application Priority Data

May 19, 2010 (KR) ........................ 10-2010-0046873

(51) Int. Cl.
*H01Q 1/24* (2006.01)

(52) U.S. Cl.
USPC .................................. 343/702; 343/700 MS

(58) Field of Classification Search
USPC .......................................... 343/702, 700 MS
See application file for complete search history.

(56) References Cited

U.S. PATENT DOCUMENTS

| | | | |
|---|---|---|---|
| 5,828,343 A * | 10/1998 | MacDonald et al. | ......... 343/702 |
| 6,473,045 B1 | 10/2002 | Duquerroy et al. | |
| 2009/0079661 A1 | 3/2009 | Chang et al. | |

FOREIGN PATENT DOCUMENTS

| | | |
|---|---|---|
| DE | 10008751 A1 | 9/2001 |
| EP | 1154517 A2 | 11/2001 |
| EP | 2146413 A1 | 1/2010 |
| JP | 2001-36319 A | 2/2001 |

* cited by examiner

*Primary Examiner* — Karl D Frech
(74) *Attorney, Agent, or Firm* — Birch, Stewart, Kolasch & Birch, LLP

(57) ABSTRACT

A mobile terminal having a docking pin for docking with a docking station is disclosed. In the mobile terminal, a mounting structure for mounting the docking pin to the mobile terminal has a reduced volume. This may assure simple assembly and mechanical reliability of the docking pin while preventing deterioration in wireless performance due to a reduced surface area of a carrier of an antenna module.

21 Claims, 6 Drawing Sheets

(a)

(b)

(c)

MOBILE TERMINAL

CROSS-REFERENCE TO RELATED APPLICATIONS

Pursuant to 35 U.S.C. §119(a), this application claims the benefit of Korean Patent Application No. 10-2010-0046873, filed on May 19, 2010, which is hereby incorporated by reference as if fully set forth herein.

BACKGROUND OF THE INVENTION

1. Field of the Invention

The present invention relates to a mobile terminal including a docking pin for docking with a docking station, in which a mounting structure for mounting the docking pin to the mobile terminal has a reduced volume and can assure simple assembly and mechanical reliability while preventing deterioration in wireless performance due to a reduced surface area of a carrier of an antenna module.

2. Description of Related Art

Terminals may be divided into mobile/portable terminals and stationary terminals according to portability thereof. The present invention relates to mobile terminals.

As mobile terminals continue to be provided with an increasing number of functions, mobile terminals implementing multimedia player functionality, such as photographing of still images or moving images, reproduction of music or moving image files, games, broadcast reception and the like, have been introduced.

Such a mobile terminal includes a built-in battery for supply of electrical energy. The built-in battery is charged using an external charging device. The charging device may be a general standard adaptor or a docking station provided by a manufacturer.

A docking station has been used as a stationary connection device for charging or data communication of a mobile terminal.

In addition to charging or data communication of a mobile terminal, the docking station may be designed such that the mobile terminal can be used while seated thereon.

Generally, the docking station may be configured such that a lower portion of a mobile phone, a length of which is longer than a width thereof, is seated on the docking station. Accordingly, a mobile terminal is provided with a docking pin for docking with the docking station. The docking pin may be exposed from a case of the mobile terminal and may be located at the lower portion of the mobile terminal.

The docking pin and an antenna of the mobile terminal may need to be electrically connected to a circuit board of the mobile terminal.

However, as mobile terminals become increasingly slimmer, the lower portion of the mobile terminal provides a limited interior space for installation of an antenna module, a docking structure and the like.

For this reason, there exists a demand for a mobile terminal including a docking pin for docking with a docking station, in which a mounting structure for mounting the docking pin to the mobile terminal has a reduced volume and can assure simple assembly and mechanical reliability while preventing deterioration in wireless performance due to a reduced surface area of a carrier of an antenna module.

BRIEF SUMMARY OF THE INVENTION

Accordingly, the present invention is directed to a mobile terminal that substantially obviates one or more problems due to limitations and disadvantages of the related art.

An object of the present invention is to provide a mobile terminal including a docking pin for docking with a docking station, in which a mounting structure for mounting the docking pin to the mobile terminal has a reduced volume and can assure simple assembly and mechanical reliability while preventing deterioration in wireless performance due to a reduced surface area of a carrier of an antenna module.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes at least one case, at least one docking pin mounted to be exposed from the case, a circuit board provided in the case and having at least one docking connection point for connection with the docking pin, and an antenna module including a carrier provided with an antenna patterned portion, wherein the docking pin is fixed to the carrier of the antenna module.

The docking pin may be fixed to a lower end of the carrier of the antenna module and the antenna module may be mounted on a lower portion of the circuit board.

The docking pin may be fixedly inserted into the lower end of the carrier of the antenna module.

The case may have a through-hole, through which the docking pin fixed to the antenna carrier penetrates so as to be exposed outside.

The mobile terminal may further include a connection clip to electrically connect the docking pin and each docking connection point to each other.

The connection clip may be integrally formed with the docking pin.

The docking pin may be welded to a lower end of the connection clip and the connection clip may be mounted to a lower portion of the carrier.

The connection clip may be integrally formed with the docking connection point.

An upper end of the docking pin may be cut into a semi-circular column shape for connection with the connection clip.

The connection clip may be formed of a thin metal plate and may have a bent shape to exhibit elasticity.

A cable socket insertion terminal for connection with a cable socket may be provided at a lower end of the circuit board, and the at least one docking connection point may be provided at either side of the cable socket insertion terminal.

The carrier of the antenna module may have a cutout region to expose the cable socket insertion terminal to the outside.

The cutout region may have a width corresponding to a width of the cable socket insertion terminal.

The at least one docking pin may be provided at either side of the cutout region.

The carrier of the antenna module and the circuit board may be respectively provided with a fastening protrusion and a fastening hole for coupling between the carrier and the circuit board.

In accordance with another aspect of the present invention, a mobile terminal includes a case, a circuit board mounted in the case, an antenna module electrically connected to the circuit board and fastened to the circuit board so as to be stacked on a lower portion of the circuit board, and an interface unit electrically connected to the circuit board and including at least one cable socket insertion terminal provided at a lower portion of the case and at least one docking pin penetrating the case so as to be exposed to the outside while being mounted to the antenna module.

The mobile terminal may further include an elastic connection clip to electrically connect the docking pin and a connection terminal of the circuit board to each other.

The docking pin may be integrally formed with the connection clip, and the antenna module fastened to the circuit board may come into elastic contact with the connection terminal of the circuit board.

The connection clip may be fixed to the connection terminal of the circuit board, and may come into elastic contact with an upper end of the docking pin in a state in which the antenna module is fastened to the circuit board.

The at least one docking pin may include a plurality of docking pins arranged with the cable socket insertion terminal interposed therebetween.

Any one of the plurality of docking pins may be any one of a charging pin, a grounding pin, and a check pin to sense a mounted state of the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes 'module', 'unit' and 'part' are attached to elements in order to facilitate the disclosure only. Therefore, significant meanings or roles are not given to the suffixes themselves and it is understood that the terms 'module', 'unit' and 'part' can be used together or interchangeably.

Examples of a mobile terminal that will be described herein may include a cellular phone, a smart phone, a laptop computer, a digital broadcast terminal, a Personal Digital Assistant (PDA), a Portable Multimedia Player (PMP), and a Global Positioning System (GPS). However, it will be easily understood by those skilled in the art that configurations according to the embodiments of the present invention may also be applied to stationary terminals, such as, e.g., a digital TV and a desktop computer, except in the case that such configuration is only applicable to mobile terminals.

Figure 1:
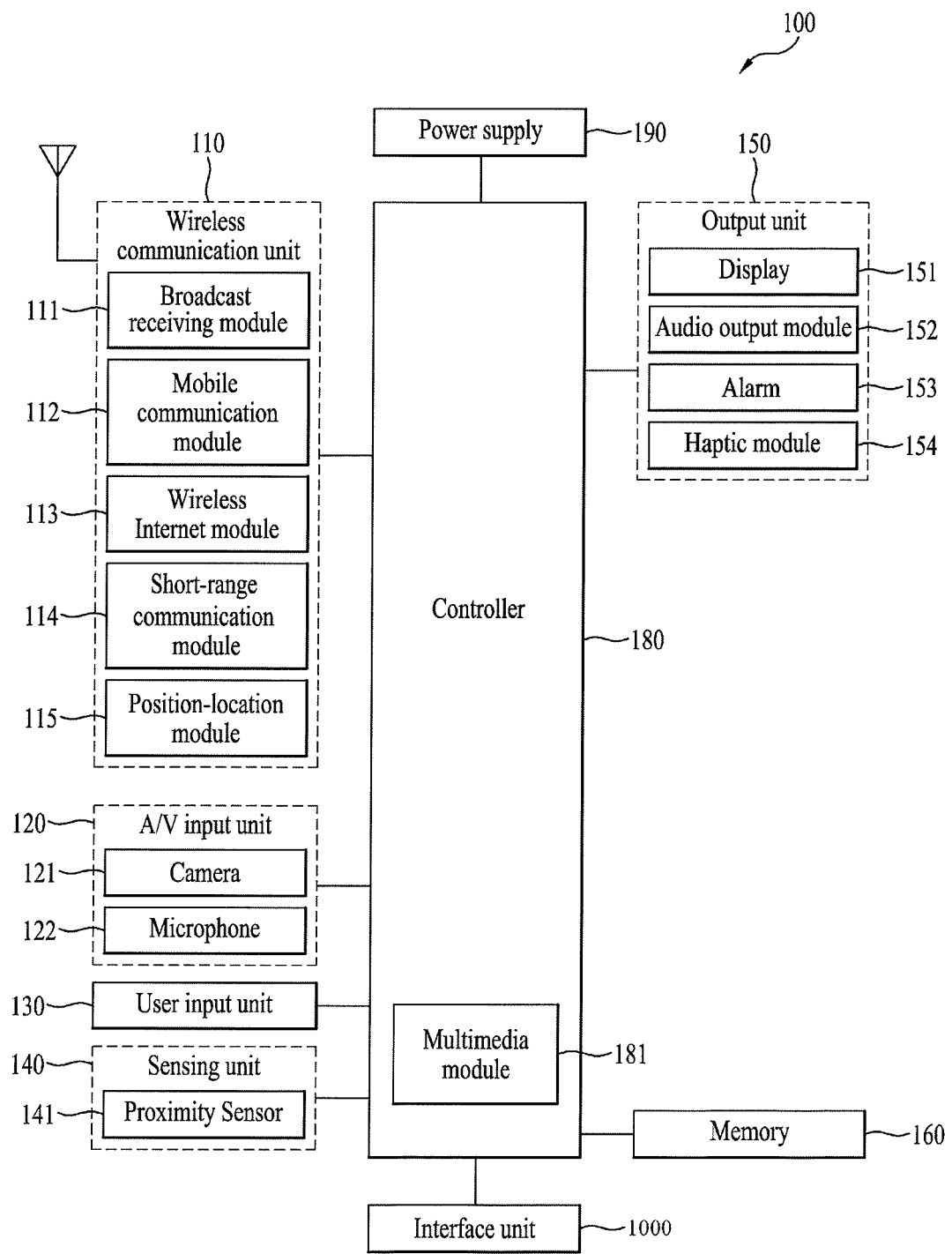
FIG. 1 is a block diagram of a mobile terminal according to an embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 1000, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each of the aforementioned constituent elements will be described.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

The A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below. The sensing unit 140 detects such a current configuration of the mobile terminal 100 as an open/closed configuration of the mobile terminal 100, a location of the mobile terminal 100, a presence or non-presence of user contacts and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 1000 and the like.

Meanwhile, the sensing unit 140 may include a proximity sensor 141.

The output unit 150 is configured to output an audio signal, a video signal and/or an alarm signal. And, the output unit 150 may include the display 151, an audio output module 152, an alarm output module 153, a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. According to an implementation type of the mobile terminal 100, at least two displays 151 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively. In case that the display 151 and a sensor for detecting a touch action (hereinafter called 'touch sensor') of such a pointer as a user's finger, a pen and the like configures a mutual layer structure (hereinafter called 'touch screen'), it is able to use the display 151 as an input device as well as an output device. In this case, the touch sensor can be configured with a touch film, a touch sheet, a touchpad or the like for example.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 151 is touched.

A proximity sensor 141 can be provided to an internal area of the mobile terminal 100 enclosed by the touch screen or around the touch screen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissible photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touch screen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touch screen is named 'contact touch'. The meaning of the position on the touch screen proximity-touched by the pointer means the position of the pointer which vertically opposes the touch screen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touch screen. The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touch screen.

The memory 160 may include at least one storage medium of such a type as a flash memory type, a hard disk type, a multimedia card micro type, a card type memory (e.g., SD memory, XD memory, etc.), RAM, SRAM (Static Random Access Memory), ROM, EEPROM (Electrically Erasable Programmable Read-Only Memory), PROM (Programmable Read-Only Memory) and the like. Moreover, the mobile terminal 100 is able to operate a web storage that performs a storage function of the memory 160 on internet. The interface unit 1000 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 1000 receives data from the external device or is supplied with power. The interface unit 1000 then delivers the received data or the supplied power to the corresponding component within the mobile terminal 100 or transmits data within the portable terminal 100 to the corresponding external device.

The interface unit 1000 is electrically connected to a circuit board of the mobile terminal 100 and may include at least one cable socket insertion terminal and a docking pin. The cable socket insertion terminal is provided in a lower portion of a case of the mobile terminal 100 that will be described hereinafter. The docking pin penetrates the case of the mobile terminal 100 so as to be exposed from the case while being mounted to an antenna module of the mobile terminal 100.

When the mobile terminal 100 is connected to an external cradle, the interface unit 1000 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touch screen into a character and an image, respectively.

The power supply 190 receives an external and/or internal power source and then supplies power required for operations of the respective components, under the control of the controller 180.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 2A:
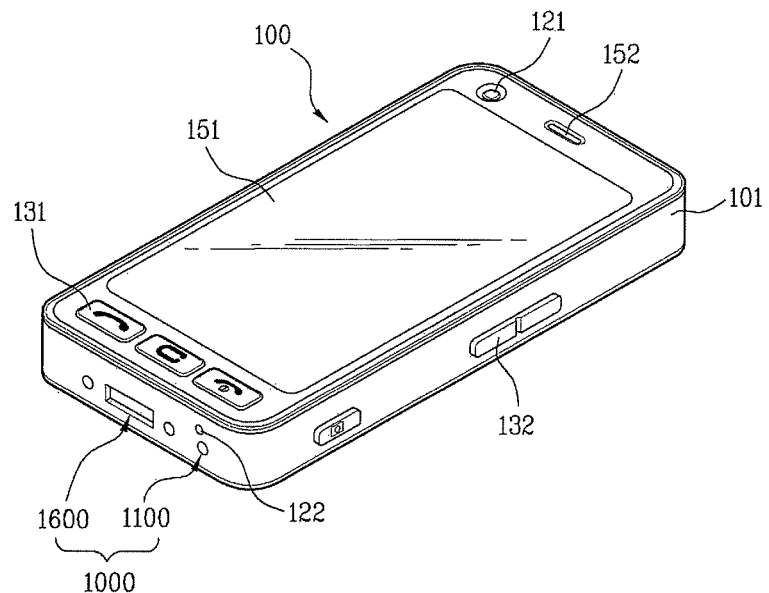
FIG. 2A is a front perspective view illustrating an exemplary configuration of a mobile terminal according to the present invention.

FIG. 2A is a front perspective view illustrating an exemplary configuration of the mobile terminal according to the present invention.

As illustrated in FIG. 2A, the mobile terminal 100 includes a bar-shaped terminal body. Of course, the present invention is not limited thereto, and may be applied to various other configurations, such as, e.g., a slide type, a folder type, a swing type and a swivel type mobile terminal, in which two or more bodies are coupled in a movable manner.

The body of the mobile terminal 100 includes a case 101 defining the external appearance thereof. In the present embodiment, the case 101 may be divided into a front case and a rear case, or may be divided into a greater number of cases. In addition, at least one intermediate case may be additionally provided between the front case and the rear case.

A variety of electronic elements are received within the case 101. The case 101 may be made by injection molding synthetic resins, or may be made of metals, such as, e.g., stainless steel (STS) or titanium (Ti).

Provided on the case 101 may be the display 151, the audio output module 152, the camera module 121, the user input unit 130/131 and 132, the microphone module 122, and the interface unit 1000.

In the embodiment illustrated in FIG. 2A, the interface unit 1000 may be provided at a lower surface of the mobile terminal 100. More specifically, the interface unit 1000 may include a docking part 1100 for docking with a docking station, or a cable terminal part 1600 for insertion of a power (or communication) cable.

As the docking part 1100 and the cable terminal part 1600 are provided at the lower surface of the mobile terminal 100, the mobile terminal 100 may perform charging or data communication in a state of being mounted in a separate docking station. Even if a docking station is not provided, a power or communication cable may be inserted into the cable terminal part 1600 to enable charging and communication of the mobile terminal 100.

The case 101 may have a through-hole, through which a docking pin fixed to an antenna carrier 3200 penetrates and is exposed outside. In the embodiment illustrated in FIG. 2A, the through-hole is perforated in a lower surface of the case 101.

Generally, a docking station, on which the mobile phone is seated when in use, is an accessory purchased by the user separately from the mobile terminal. Therefore, charging or data communication of the mobile terminal 100 may be performed using any one of a docking station or a power (or communication) cable according to whether or not the user owns the docking station.

The docking part 1100 and the cable terminal part 1600 may respectively include a docking terminal and a cable terminal. Each of the docking terminal and the cable terminal must be electrically connected to a circuit board (not shown) of the mobile terminal 100.

Of course, although only one of the docking parts 1100 and the cable terminal part 1600 may be arranged at the lower surface of the mobile terminal 100. For example, the docking part 1100 may be arranged at the lower surface of the mobile terminal 100 and the cable terminal part 1600 may be arranged at a lateral surface of the mobile terminal 100, providing a united connection region between the circuit board and the interface unit 1000 may result in enhanced assembly convenience and simplified design of the circuit board.

In the case of standard, present day mobile terminals, the mobile communication module 112 of the wireless communication unit 110, for example, the antenna module (not shown), is frequently arranged in a lower region, rather than an upper region, of the case 101 of the mobile phone 100, in order to minimize exposure to electromagnetic radiation.

That is, to satisfy regulations concerning exposure to electromagnetic radiation, the antenna module may be arranged near the microphone module (at a lower end of the mobile terminal 100).

Installation positions of the antenna module (not shown), the docking part 1100 and the cable terminal part 1600 may be concentrated in the lower region of the interior space of the mobile terminal 100. Thus, it is necessary to consider an installation position of the antenna module (not shown), optimized arrangements and assembly efficiency of the docking part 1100 and the cable terminal part 1600, durability of the mobile terminal 100 and the like.

The display 151 occupies the majority of a front surface of the case 101. The audio output module 151 and the camera module 121 are arranged at positions adjacent to one end of the display 151, and the user input unit 131 and the microphone module 122 are arranged at positions adjacent to the other end of the display 151. The user input unit 132 may be arranged at the lateral surface of the case 101.

The user input unit 130 serves to receive a command to control operation of the mobile terminal 100, and may include a plurality of manipulating units 131 and 132. The manipulating units 131 and 132 may also be referred to as manipulating portions and may have various shapes enabling the user to physically manipulate the same.

The first or second manipulating unit 131 or 132 may be used to input various commands. For example, the first manipulating unit 131 may be used to input start, end, and scroll commands, and the second manipulating unit 132 may be used to input a command for controlling the volume of sound output from the audio output module 152, or a command for activating or deactivating a touch sensing function of the display 151.

Figure 2B:
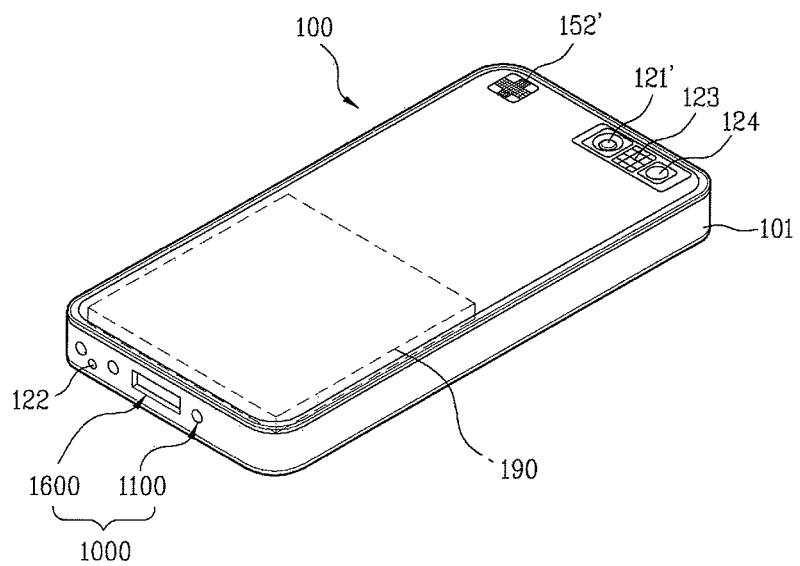
FIG. 2B is a rear perspective view of the mobile terminal illustrated in FIG. 2A.

FIG. 2B is a rear perspective view of the mobile terminal illustrated in FIG. 2A.

Referring to FIG. 2B, a camera module 121' may be additionally mounted in a rear surface of the terminal body, i.e. in the rear case. The camera module 121' captures an image in a direction that is substantially opposite to that of the camera module 121 (see FIG. 2A) and may have a different resolution from the camera module 121.

For example, the camera module 121 is preferably a low pixel camera module suitable for streaming video, e.g., a video call. In the case of a video call, the camera module 121 functions to capture a user face and simultaneously transmit the captured image. The camera module 121' is preferably a high pixel camera module. The camera module 121' is used to capture a still image that is unnecessary to be transmitted at once. These camera modules 121 and 121' may be installed to the terminal body in a rotatable manner or in a retractable manner.

A flash 123 and a mirror 124 may be additionally provided at positions adjacent to the camera module 121'. The flash 123 serves to irradiate light to a subject while the camera module 121' photographs the subject. The mirror 124 allows the user to look at themselves when taking a picture of their face using the camera module 121' (self photographing).

An audio output module 152' may be additionally provided at the rear surface of the terminal body. The audio output module 152' may realize a stereo sound system along with the audio output module (152, see FIG. 2A), and may also enable a speakerphone operation to be performed.

The terminal body is provided with the power supply unit 190 to supply power to the mobile terminal 100. The power supply unit 190 may be integrated with the terminal body, or may be coupled to the exterior of the terminal body in a separable manner.

Figure 3:
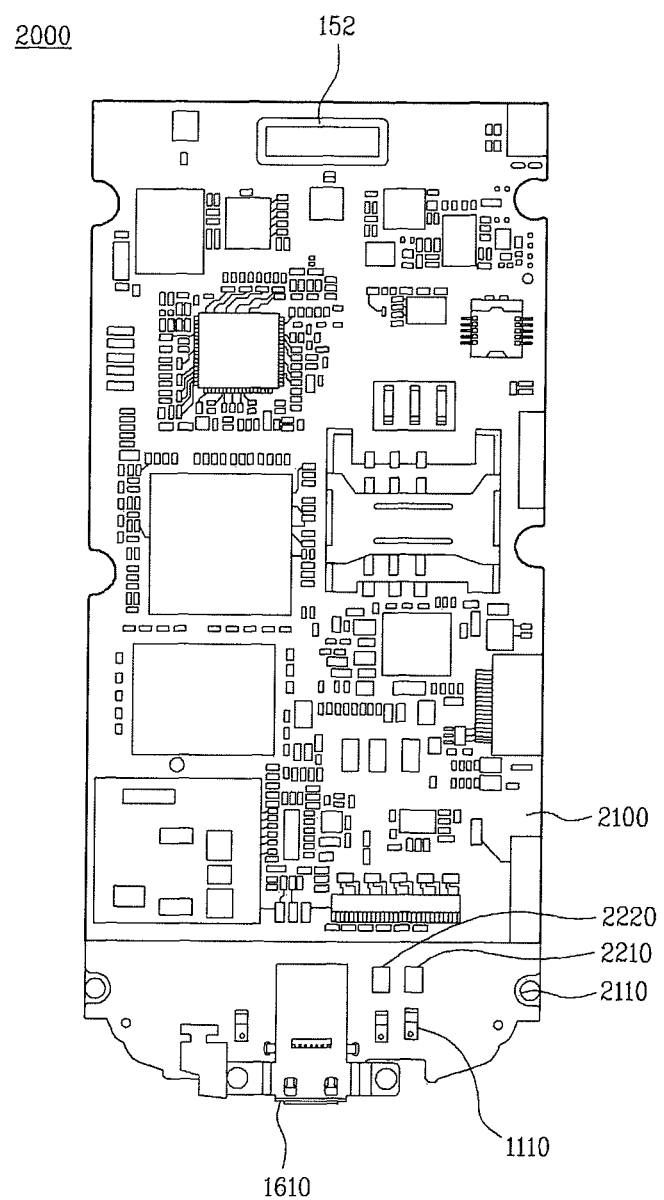
FIG. 3 is a view illustrating an embodiment of a circuit board of the mobile terminal according to the present invention.

FIG. 3 is a view illustrating an embodiment of a circuit board 2000 of the mobile terminal according to the present invention. The circuit board 2000 provides a place where a variety of elements constituting the controller 180, the wireless communication unit 110, the A/V input unit 120, the output unit 150 or the memory 160, integrated circuits, or the like are mounted. The circuit board 2000 may be a Printed Circuit Board (PCB).

A description related to the variety of elements constituting the controller 180, the wireless communication unit 110, the A/V input unit 120, the output unit 150 or the memory 160 will be omitted hereinafter.

The audio output module 152 of the output unit 150 may be located at an upper region of the circuit board 2000.

The circuit board 2000 may be provided with a docking connection point 1110 and a cable socket insertion terminal 1610 which respectively constitute the docking part 1100 and the cable terminal part 1600 described above. The cable socket insertion terminal 1610 may be located at the center of a lower end of the circuit board 2000.

A plurality of docking connection points 1110 may be provided. In the embodiment illustrated in FIG. 3, a total of three docking connection points 1110 are provided. However, the number of the docking connection points 1110 may be determined according to the function and role of the docking part 1100.

The cable socket insertion terminal 1610 for connection of a cable socket is provided at the lower end of the circuit board 2000. At least one docking connection point 1110 may be provided at either side of the cable socket insertion terminal 1610.

For example, in a state in which the antenna module (not shown) is mounted on the circuit board 2000, a plurality of docking pins 1120 may be provided around the cable socket insertion terminal 1610.

Any one of the plurality of docking pins 1120 may be selected from among charging pins, grounding pins, and check pins to sense a mounted state of the mobile terminal.

The total of three docking connection points 1110 illustrated in FIG. 3 may include a charging pin, a grounding pin, and an ID check pin (i.e. a terminal to determine whether the mobile terminal is mounted on or separated from a docking station).

As described above, the docking part 1100 and the cable terminal part 1600 are located at the lower end of the circuit board 2000. Also, the antenna module (not shown) that will be described hereinafter may be mounted and be electrically connected to a lower region of the circuit board 2000. Therefore, the docking part 1100, the cable terminal part 1600, and the antenna module (not shown) must be densely arranged on a lower end region of the circuit board 2000.

The circuit board 2000 may be further provided with a feeding connection terminal 2210 and a grounding connection terminal 2220, which serve as antenna connection terminals for installation of the antenna module.

Accordingly, efficient arrangement of elements may be essential to mount the docking part 1100, the cable terminal part 1600 and the antenna module (not shown) in a limited space.

Of course, both the docking part 1100 and the cable terminal part 1600 may be provided, or only one thereof may be provided. Even if only one of the docking part 1100 and the cable terminal part 1600 is provided, it must be mounted at the same region as the antenna module and thus, efficient arrangement of elements may also be required.

Figure 4:
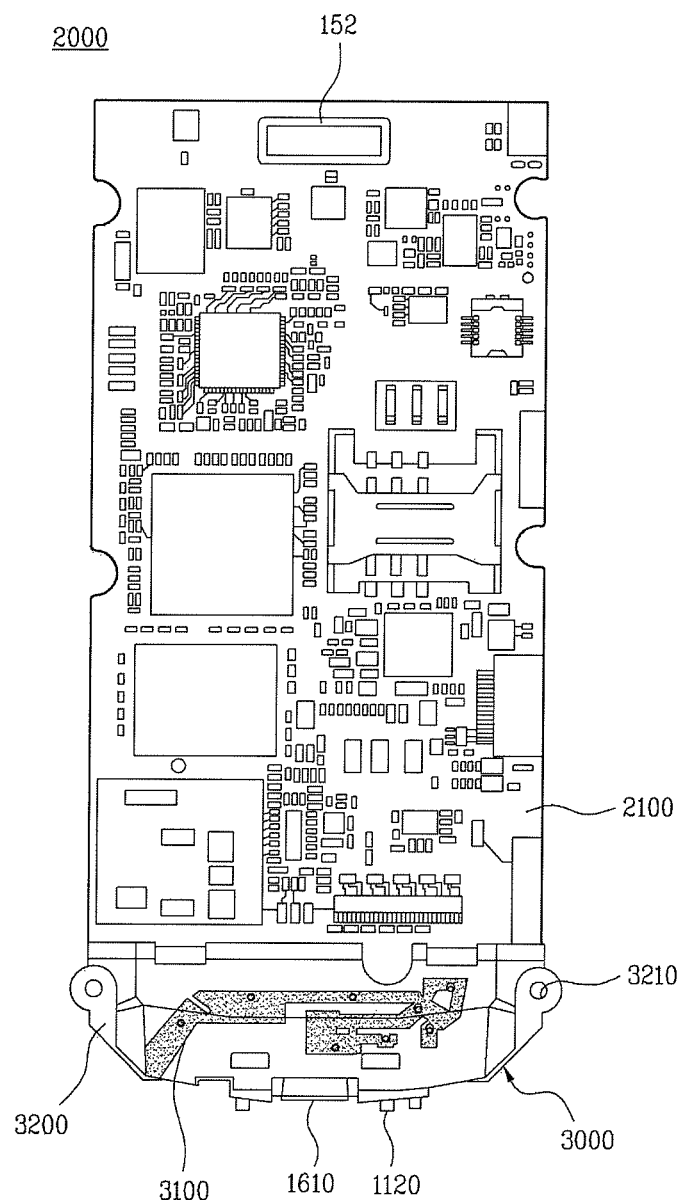
FIG. 4 is a view illustrating an embodiment in which an antenna module is mounted on the circuit board of the mobile terminal according to the present invention.

FIG. 4 is a view illustrating an embodiment in which an antenna module 3000 is mounted on the circuit board 2000 of the mobile terminal according to the present invention.

The antenna module 3000 may include a patterned portion 3100 for wireless reception/transmission and a carrier 3200 to support the patterned portion 3100.

The carrier 3200 may have fastening holes 3210 required to fix the antenna module 3000 to the circuit board 2000. The docking pins 1120 constituting the docking part 1100 may be mounted at a lower end of the antenna module 3000 so as to protrude downward.

The antenna module 3000 may be mounted in the lower region of the circuit board 2000 and more particularly, may be stacked on the lower region of the circuit board 2000. Arranging the docking pins 1120 to protrude outward may allow the docking pins 1120 to come into contact with terminals of a docking station (not shown) when the mobile terminal 100 is seated on the docking station.

Accordingly, the docking pins 1120 may have a predetermined protruding length depending on the thickness of the case 101, etc.

The mobile terminal according to the present invention includes at least one case 101, at least one docking pin exposed from the case 101 and the circuit board 2000 and the antenna module 3000 received in the case 101, the circuit board 2000 having at least one docking connection point to be connected to the docking pin 1120, the antenna module 3000 including the patterned portion 3100 and the carrier 3200 and the docking pin 1120 being fixed to the carrier 3200 of the antenna module 3000. The docking pin 1120 is fixed to a lower end of the carrier 3200 of the antenna module 3000. The antenna module 3000 may be mounted in the lower region of the circuit board 2000.

The mobile terminal 100 according to the present invention has a feature in that the docking pin 1120 is mounted to the antenna module 3000 rather than the case 101 of the mobile terminal 100.

Most conventional mobile terminals have been configured such that a docking pin is directly mounted to a case defining the external appearance of the mobile terminal.

However, this necessitates a separate structure for mounting and fixing the docking pin to the case, causing deterioration in assembly efficiency and increasing manufacturing costs.

However, in the mobile terminal according to the present invention, the docking pin 1120 may be fixed to the antenna module 3000 and in turn, the antenna module 3000 provided with the docking pin 1120 may be fastened to the circuit board 2000 by use of fastening members (e.g., bolts).

Here, the carrier 3200 of the antenna module 3000 and the circuit board 2000 may be provided with fastening holes.

As illustrated in FIG. 4, the carrier 3200 of the antenna module 3000 and the circuit board 2000 may have fastening holes 2110 and 3210 corresponding to each other (see FIGS. 3 and 4), assuring firm installation of the antenna module 3000.

Hereinafter, a method of mounting the docking pin 1120 to the antenna module 3000 and a structure for connecting the docking pin 1120 mounted on the antenna module 3000 to a docking pin connection terminal of the circuit board 2000 will be described with reference to FIGS. 5 and 6.

Figure 5:
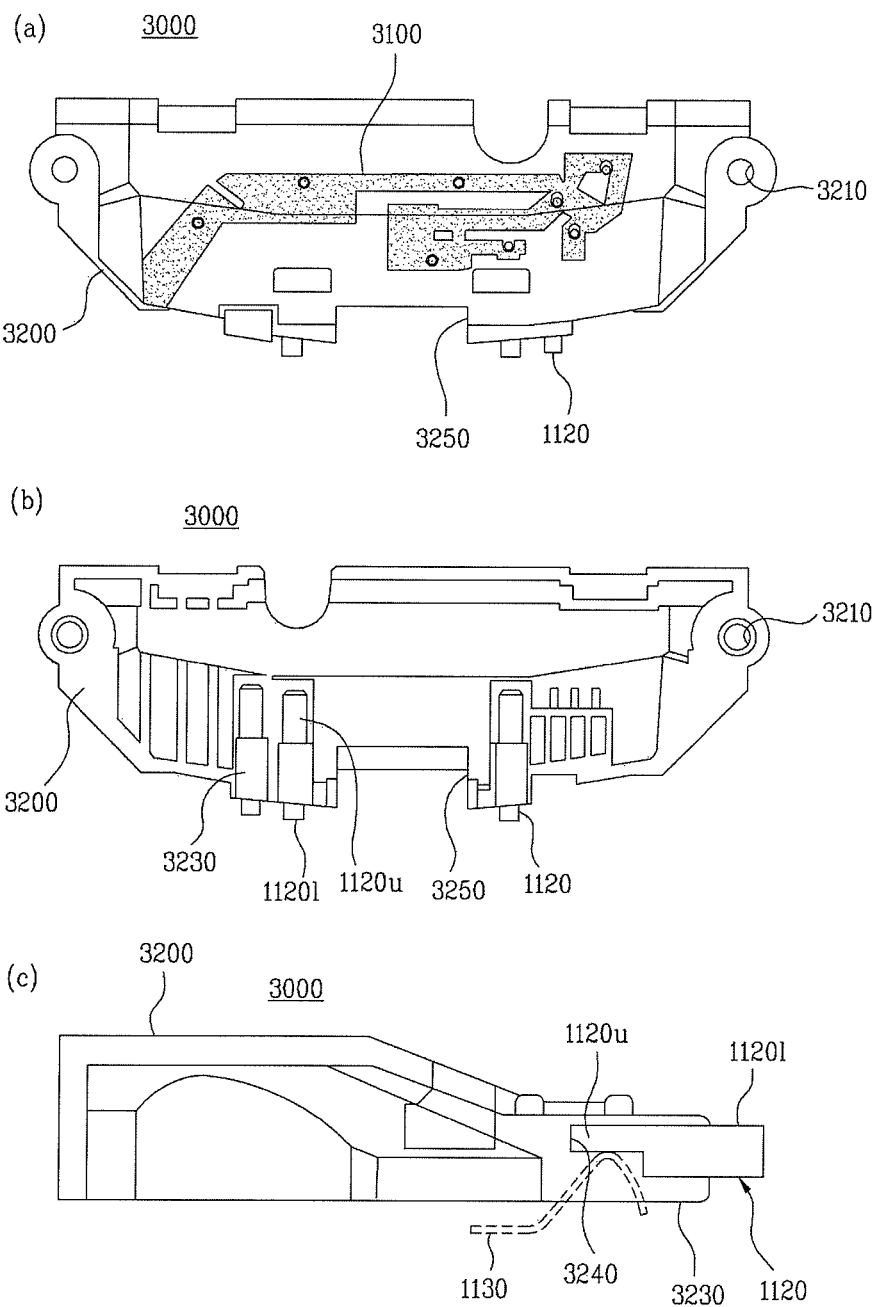
FIG. 5 is a view illustrating an embodiment of the antenna module provided in the mobile terminal according to the present invention.

FIG. 5 is a view illustrating an embodiment of the antenna module provided in the mobile terminal according to the present invention. More specifically, FIG. 5(a) is a front view of the antenna module, FIG. 5(b) is a rear view of the antenna module and FIG. 5(c) is a side view illustrating the interior of the antenna module.

The antenna module 3000 illustrated in FIG. 5 may include the carrier 3200 on which the patterned portion 3100 for reception or transmission of electric waves is formed.

The patterned portion 3100 has a bent shape corresponding to the outer contour of the carrier 3200. The carrier 3200 may be made of plastic.

As described above, the antenna module 3000 is provided at the lower end thereof with the docking pin 1120 constituting the docking part (1100, see FIG. 2).

The docking pin 1120 may take the form of a metal bar, and may be inserted into a lower surface of the carrier 3200 of the antenna module 3000. To this end, the carrier 3200 may be provided at the lower surface thereof with an inserting portion 3230 into which the docking pin 1120 is inserted.

A lower end of the docking pin 1120 may penetrate through the lower surface of the case of the mobile terminal so as to be exposed downward out of the carrier 3200.

As illustrated in FIG. 5, a lower end 1120*l* of the docking pin 1120 may have a circular column shape, and an upper end 1120*u* of the docking pin 1120 may have a semicircular column shape to assure stable connection with a connection clip 1130.

A partial region of the circular column shaped lower end 1120*l* of the docking pin 1120 may be embedded in the pipe shaped inserting portion 3230 of the carrier 3200.

The carrier 3200 may further have a stepped portion 3240 to limit an insertion depth of the docking pin 1120. The stepped portion 3240 limits an insertion depth of the docking pin 1120 when the docking pin 1120 is inserted upward from the bottom of the carrier 3200, thereby allowing the docking pin 1120 to be accurately mounted.

The inserting portion 3230 may have an inner diameter corresponding to an outer diameter of the circular column shaped lower end 1120*l* of the docking pin 1120. Specifically, there is no clearance between the inserting portion 3230 and the docking pin 1120, assuring reinforced installation of the docking pin 1120. The semicircular column shaped upper end 1120*u* of the docking pin 1120 may be arranged such that a flat outer surface portion thereof faces the rear surface of the carrier 3200.

The mobile terminal 100 according to the present invention may include the connection clip 1130 to electrically connect the docking pin 1120 and the docking pin connection terminal to each other.

When the flat outer surface portion of the semicircular column shaped upper end 1120*u* of the docking pin 1120 is arranged to face the rear surface of the carrier 3200, the connection clip 1130, which is provided at the circuit board 2000 and serves to connect the docking pin 1120 and the docking connection point 1110 of the docking part 1100 to each other, may stably come into contact with the semicircular column shaped upper end 1120*u* of the docking pin 1120.

The docking connection point 1110 of the docking part 1100 may be a general terminal, or may be integrally formed with the connection clip 1130.

For example, the connection clip 1130 may be an elastic clip. Thus, when the docking connection point 1110 is an elastic clip, strength and resistance to external shock can be achieved.

As illustrated in FIG. 5, since the docking pin 1120 is partially embedded in the carrier 3200 of the antenna module 3000, it is possible to omit a separate structure for mounting the docking pin 1120 to the case of the mobile terminal 100 and to improve reliability in electrical connection between the docking pin 1120 and the docking connection point provided at the circuit board.

Also, when the docking pin 1120 is directly mounted to the case of the mobile terminal 100, a lower end position of the carrier 3200 corresponding to each docking pin 1120 is cut to enable connection between the docking pin 1120 and the docking connection point of the circuit board.

For example, the carrier 3200 of the antenna module 3000 may have a cutout region 3250 through which the cable socket insertion terminal 1610 is exposed outside.

The cutout region 3250 may have a width corresponding to a width of the cable socket insertion terminal 1610. At least one docking pin 1120 may be provided at either side of the cutout region 3250.

The above described configuration may reduce a surface area of the carrier 3200 of the antenna module 3000. The carrier 3200 having a reduced surface area may fail to provide a sufficient surface area for provision of the patterned portion, thereby deteriorating wireless performance.

However, in the mobile terminal according to the present invention, the docking pin 1120 is inserted into the lower portion of the carrier 3200 of the antenna module 3000 without a mounting structure for mounting the docking pin 1120 to the case of the mobile terminal 100. This may reduce the cutout region that is formed in the lower end region of the carrier 3200 for installation of the above-described mounting structure, thereby having less effect on wireless performance.

Also, since the docking pin 1120 can be electrically connected to the docking terminal portion of the circuit board while being mounted in the carrier 3200, enhanced mechanical reliability and assembly efficiency may be accomplished.

In the embodiment illustrated in FIG. 5, since the connection clip 1130 may be bent to exhibit elasticity, the connection clip 1130 may be fixed to the connection terminal 1110 of the circuit board and may come into elastic contact with the upper end 1120u of the docking pin 1120 in a state in which the antenna module 3000 is fastened to the circuit board.

However, in the embodiment illustrated in FIG. 6 that will be described hereinafter, the docking pin 1120 may be integrally formed with the connection clip 1130. The connection clip 1130 integrally formed with the docking pin 1120 may come into elastic contact with the docking connection point 1110 of the circuit board 2000 in a state in which the antenna module 3000 is fastened to the circuit board 2000.

Figure 6:
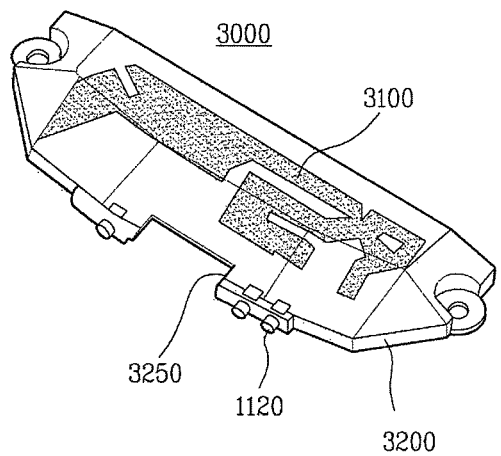
FIG. 6 is a view illustrating another embodiment of the antenna module provided in the mobile terminal according to the present invention.
Figure 6:
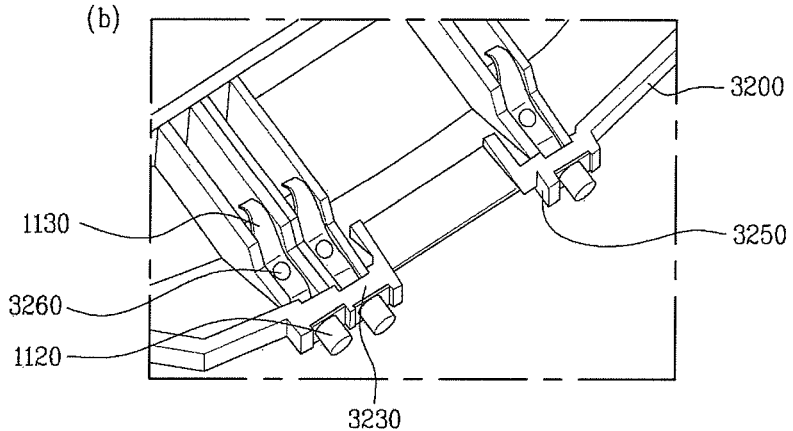
Figure 6:
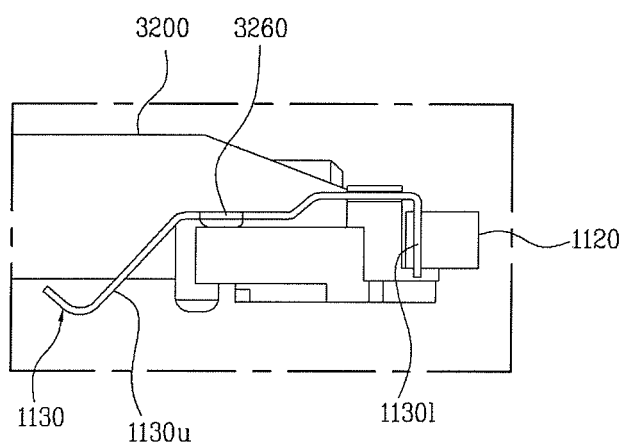

FIG. 6 is a view illustrating another embodiment of the antenna module provided in the mobile terminal according to the present invention. More specifically, FIG. 6(a) is a front view of the antenna module, FIG. 6(b) is a rear view of the antenna module and FIG. 6(c) is a side view illustrating the interior of the antenna module. A description of the same configurations as FIG. 5 will be omitted hereinafter.

The mobile terminal according to the present invention may further include an elastic connection clip, a lower end of which is welded to the docking pin. The connection clip may be mounted in the lower portion of the carrier.

Similar to the description with reference to FIG. 5, in the embodiment illustrated in FIG. 6, the docking pin 1120 is mounted to the carrier 3200 of the antenna module 3000.

In the present embodiment, instead of the docking pin 1120 being directly inserted into the carrier 3200, the elastic connection clip 1130, which electrically connects the docking pin 1120 to the docking connection point (1110, see FIG. 3) of the circuit board, is mounted to the carrier 3200 of the antenna module 3000 and the docking pin 1120 may be welded to the lower end of the connection clip 1130.

An upper end 1130u of the elastic connection clip 1130 has a bent shape and is adapted to come into elastic contact with the docking connection point of the circuit board 2000. A lower end 1130l of the elastic connection clip 1130 is fixed to the upper end of the docking pin 1120.

The connection clip 1130 is formed of a thin metal plate and may exhibit elastic force when bent.

The upper end 1130u of the elastic connection clip 1130 may penetrate through the inserting portion 3230 of the carrier 3200 so as to be exposed outside. The upper end 1130u of the elastic connection clip 1130 may be inserted upward from the bottom of the inserting portion 3230 of the carrier 3200.

The docking pin 1120 and the elastic connection clip 1130 may be integrally formed with each other, or may be welded to each other after being independently fabricated.

The upper end 1130u of the elastic connection clip 1130 may be bent in various directions.

The bent shape of the elastic connection clip 1130 may ensure secure attachment to the inserting portion 3230.

The connection clip 1130 and the carrier 3200 are provided respectively with a fastening protrusion and a fastening hole for insertion of the fastening protrusion, to reinforce coupling strength of the connection clip 1130.

In the embodiment illustrated in FIG. 6, the carrier 3200 is provided at a lower portion of a rear surface thereof with a fastening protrusion 3260 and the connection clip 1130 is provided with a fastening hole (not designated by a reference numeral) for insertion of the fastening protrusion 3260.

Owing to the fastening protrusion 3260 and the fastening hole, the connection clip 1130 may be inserted in the inserting portion 3230 with the reinforced coupling strength. Once the connection clip 1130 is completely inserted into the inserting portion 3230, the connection clip 1130 may be completely mounted as the fastening protrusion 3260 is inserted into the fastening hole.

Similarly, in the embodiment illustrated in FIG. 6, the docking pin 1120 is mounted using the carrier 3200 of the antenna module 3000 without a structure for mounting the docking pin 1120 to the case of the mobile terminal and to allow the docking pin 1120 to be electrically connected to the docking connection point of the circuit board via the elastic connection clip 1130 fixed to the upper end of the docking pin 1120, resulting in enhanced mechanical reliability and assembly efficiency.

Further, since the connection clip 1130 welded to the docking pin 1120 may be inserted through the inserting portion 3230 formed in the lower end of the carrier 3200, it is unnecessary to cut out the front surface of the carrier 3200 where the patterned portion 3100 is provided. This may prevent reduction in the area of the carrier, providing a sufficient surface area for connection between the docking pin and the docking connection point and resulting in enhanced wireless performance, similar to the above described embodiment.

As illustrated in FIGS. 5 and 6, the carrier 3200 of the antenna module 3000 may be provided at the lower end thereof with the cutout region 3250 between the docking pins 1120. The cutout region 3250 is provided for installation of the cable socket insertion terminal 1610 illustrated in FIG. 3 and is defined by cutting a portion of the carrier 3200 in consideration of the thickness of the cable socket insertion terminal 1610.

In the mobile terminal according to the present invention, the docking pin 1120 for docking with a docking station and the cable socket insertion terminal 1610 are provided at the lower surface of the mobile terminal 100. Thus, the feeding or grounding connection terminal of the antenna module 3000, the cable socket insertion terminal, and the docking connection point must be densely arranged at the lower end of the circuit board.

Assuming that the docking pin 1120 is mounted to the case, the lower region of the carrier should be cut out to provide an opening for installation of an electric structure that is required to mount the docking pin. Cutting out a partial area of the antenna module means that the antenna module has a reduced surface area available for formation of the patterned portion 3100. The antenna module having an insufficient surface area may deteriorate sensitivity to electrical waves transmitted to the mobile terminal.

To solve the above described problem, a method of mounting the docking pin 1120 and the cable socket insertion terminal 1610 while achieving a sufficient area of the carrier 3200 of the antenna module 3000 is that the docking pin 1120 is mounted using the carrier 3200 of the antenna module 3000. This method may minimize the area of the cutout region 3250.

As is apparent from the above description, a mobile terminal according to the present invention can employ a docking pin mounting structure having a minimized volume. Further, the mobile terminal according to the present invention may minimize a reduction in the volume of an antenna carrier provided therein, preventing deterioration in wireless performance.

Furthermore, the mobile terminal according to the present invention may minimize the number of elements constituting the docking pin and the like, achieving simplified assembly and mechanical reliability.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal comprising:
at least one case having a through hole;
a docking pin for docking with a docking station, the docking pin being provided in the case, the docking pin at least partially extending into the through hole to be exposed to the exterior of the mobile terminal;
a circuit board provided in the case and having a docking connection point to connect with the docking pin; and
an antenna module provided in the case, the antenna module including:
a carrier; and
an antenna patterned portion provided at a first surface of the carrier,
wherein the docking pin is fixed to a second surface of the carrier opposite the first surface of the carrier of the antenna module, and
wherein the circuit board includes one or more antenna connection terminals for installation of the antenna module.

2. The mobile terminal according to claim 1, wherein the docking pin is fixed to a lower end of the carrier of the antenna module, and the antenna module is mounted on a lower portion of the circuit board.

3. The mobile terminal according to claim 2, wherein the docking pin is fixedly inserted into the lower end of the carrier of the antenna module.

4. The mobile terminal according to claim 1, further comprising a connection clip to electrically connect the docking pin to the docking connection point.

5. The mobile terminal according to claim 4, wherein the connection clip is integrally formed with the docking pin.

6. The mobile terminal according to claim 4, wherein the docking pin is welded to a lower end of the connection clip and the connection clip is mounted to the lower portion of the carrier.

7. The mobile terminal according to claim 4, wherein the connection clip is integrally formed with the docking connection point.

8. The mobile terminal according to claim 4, wherein an upper end of the docking pin has a semicircular column shape for connection with the connection clip.

9. The mobile terminal according to claim 4, wherein the connection clip is formed of a thin metal plate and has a bent shape to be in elastic contact with the docking pin.

10. The mobile terminal according to claim 1, further comprising a cable socket insertion terminal for receiving a cable socket, the cable socket insertion terminal being provided at the lower end of the circuit board, and the docking connection point being provided at one side of the cable socket insertion terminal.

11. The mobile terminal according to claim 10, wherein the carrier of the antenna module has a cutout region to expose the cable socket insertion terminal from within the case.

12. The mobile terminal according to claim 11, wherein the cutout region has a width corresponding to a width of the cable socket insertion terminal.

13. The mobile terminal according to claim 11, wherein docking pin is provided at one side of the cutout region.

14. The mobile terminal according to claim 1, wherein both the carrier of the antenna module and the circuit board have a fastening hole to couple the carrier to the circuit board.

15. The mobile terminal according to claim 1, further comprising:
a second docking pin provided in the case to be exposed from within the case; and
a second docking connection point to connect with the second docking pin,
wherein the second docking pin is fixed to the carrier of the antenna module.

16. A mobile terminal comprising:
a case having a through hole;
a circuit board located in the case;
an antenna module including an antenna patterned portion electrically connected to the circuit board by antenna connection terminals and fastened to the circuit board so as to be stacked on a lower portion of the circuit board; and
an interface unit electrically connected to the circuit board, the interface unit including:
at least one cable socket insertion terminal provided at a lower portion of the case; and
at least one docking pin for docking with a docking station, the docking penetrating the through hole so as to be exposed externally, the at least one docking pin being mounted to the antenna module,
wherein the antenna patterned portion is provided at a first surface and the docking pin is provided at a second surface opposite the first surface.

17. The mobile terminal according to claim 16, further comprising an elastic connection clip to electrically connect the at least one docking pin to a connection terminal of the circuit board.

18. The mobile terminal according to claim 17, wherein the at least one docking pin is integrally formed with the connection clip, and the connection clip is in elastic contact with the connection terminal of the circuit board.

19. The mobile terminal according to claim 17, wherein the connection clip is fixed to the connection terminal of the circuit board, and the connection clip is brought into elastic contact with an upper end of the docking pin in a state in which the antenna module is fastened to the circuit board.

20. The mobile terminal according to claim 16, wherein the at least one docking pin includes a plurality of docking pins arranged with the cable socket insertion terminal interposed therebetween.

21. The mobile terminal according to claim 20, wherein any one of the plurality of docking pins is any one of a charging pin, a grounding pin, and a check pin to sense a mounted state of the mobile terminal.

* * * * *